June 2, 1970 G. WEHR ET AL 3,515,185
APPARATUS FOR REMOVING BRANCHES AND BARK FROM TREES
Filed March 31, 1967 10 Sheets-Sheet 1
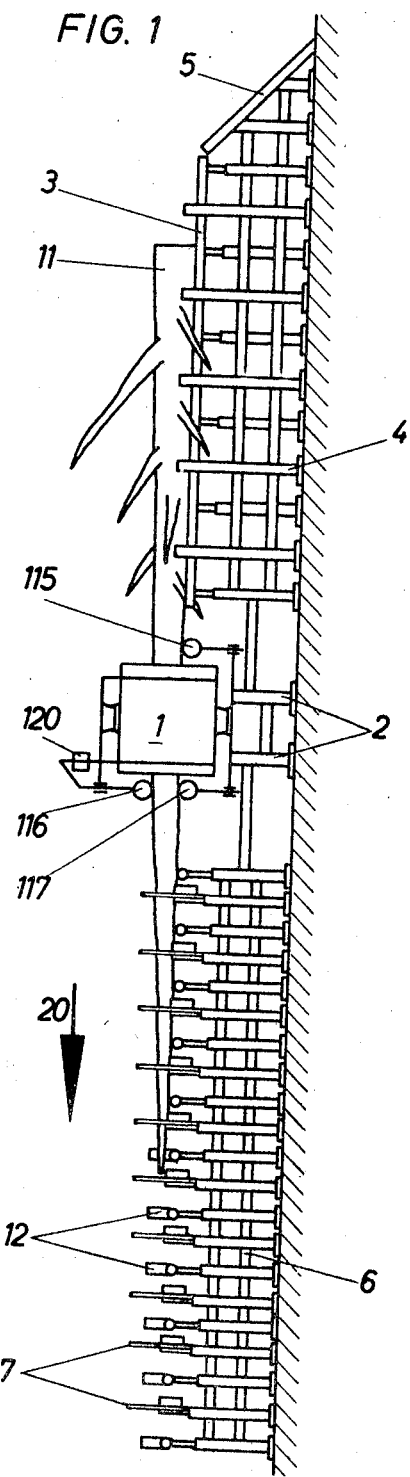
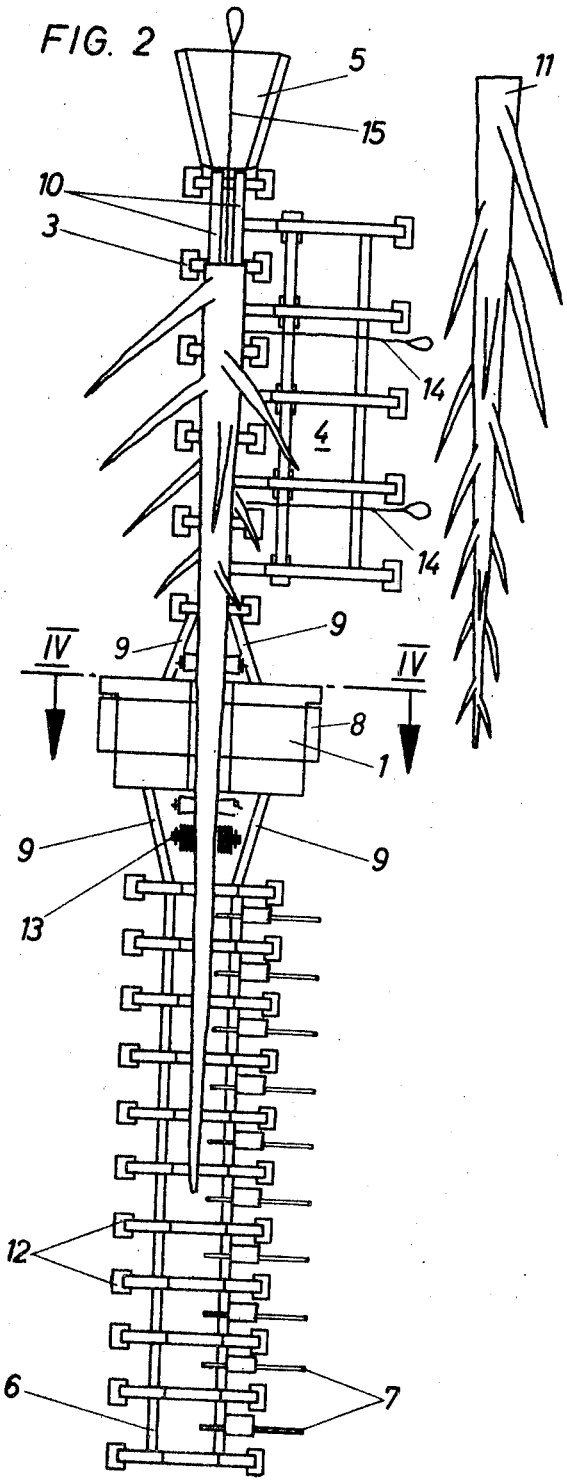

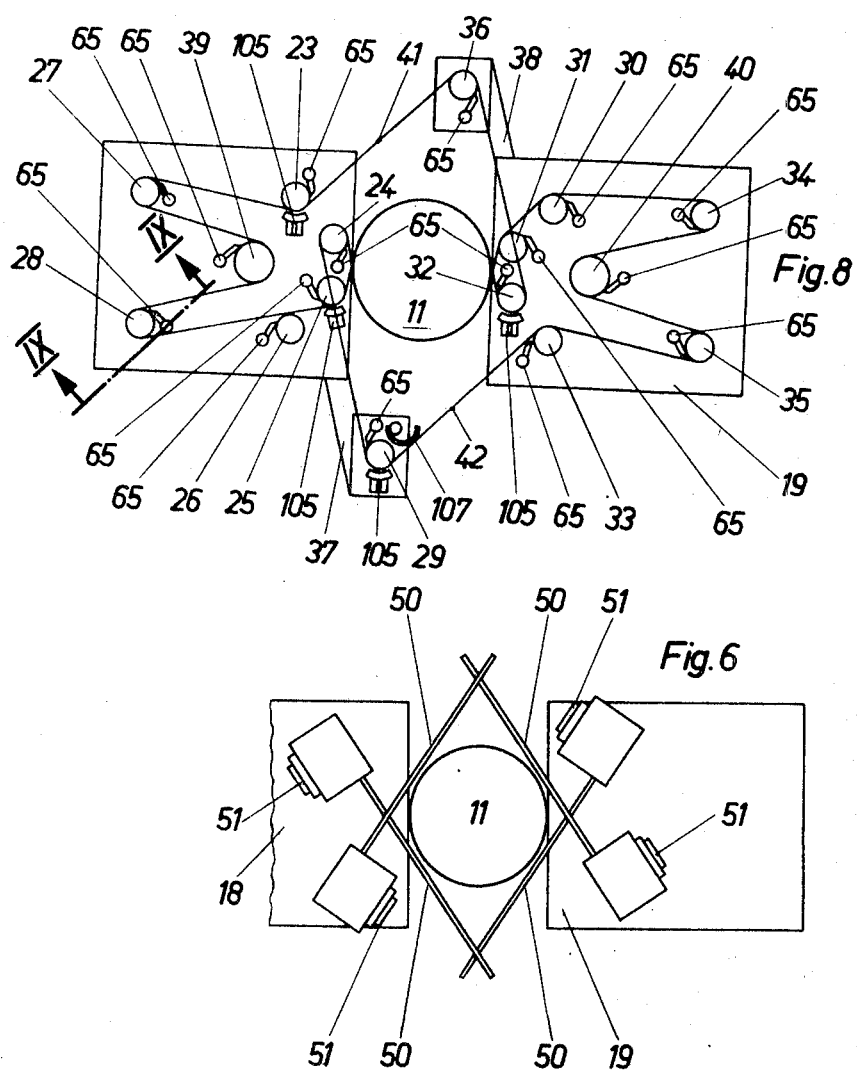

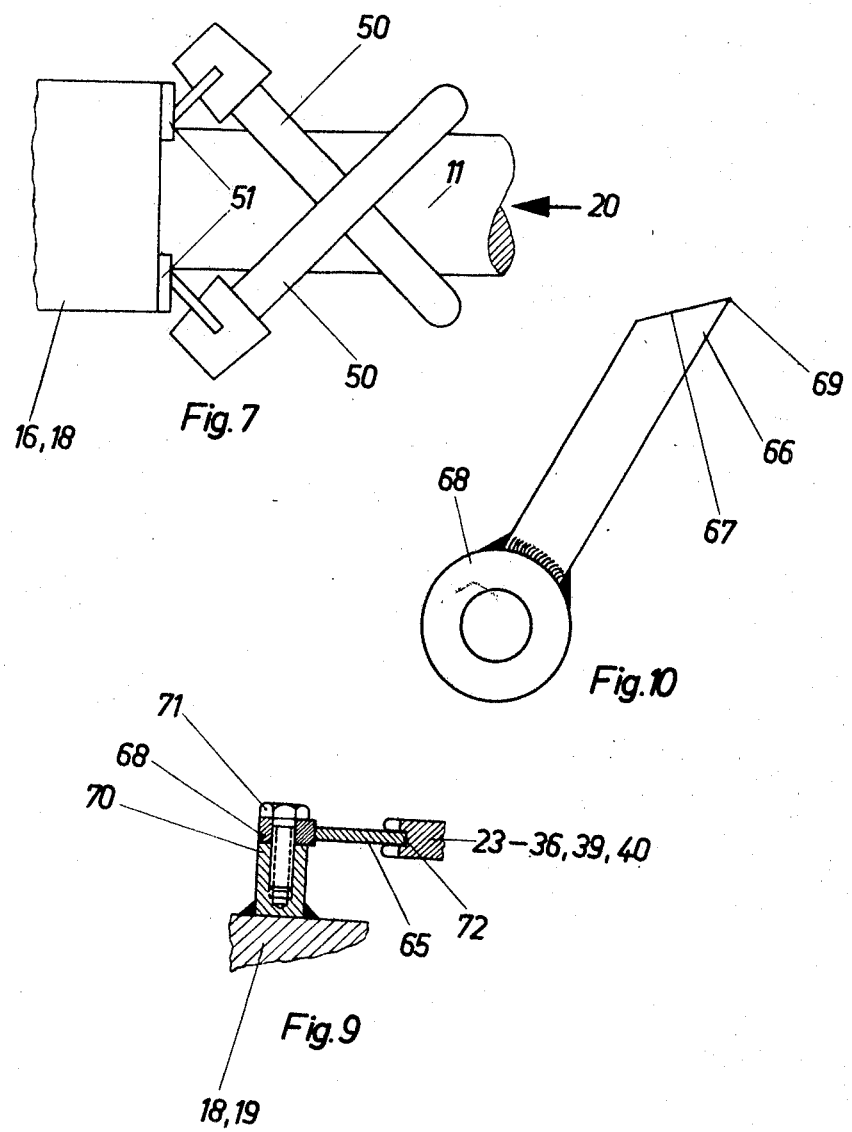

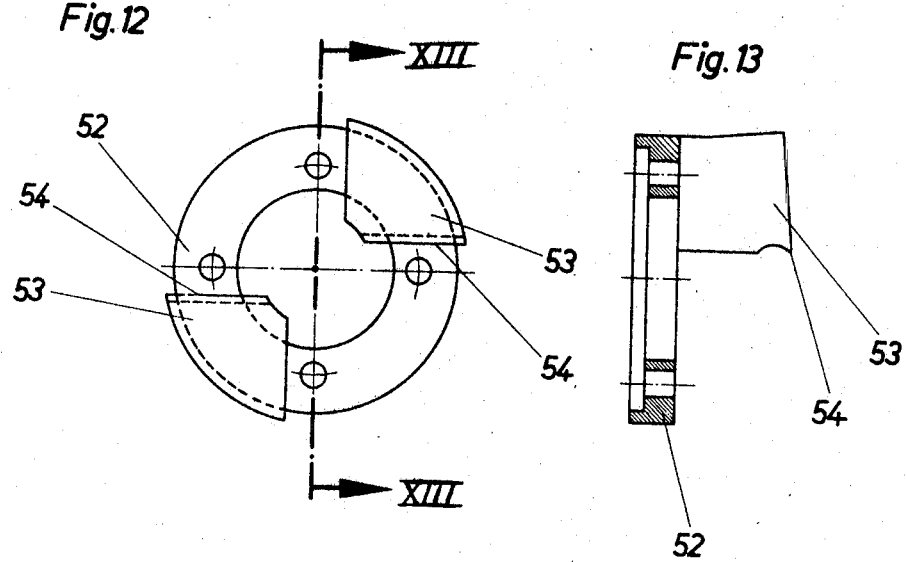
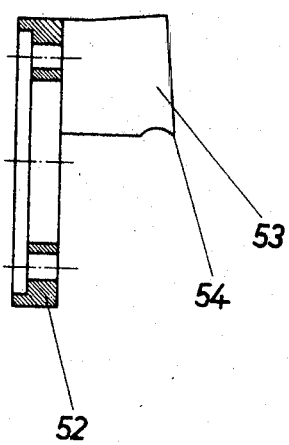
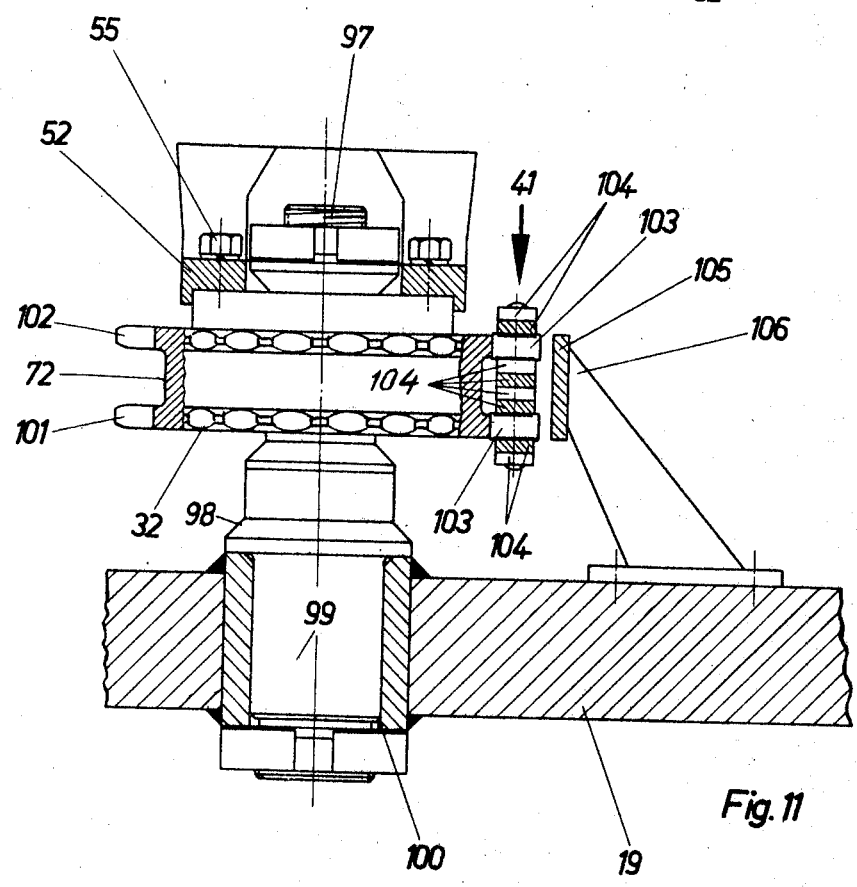

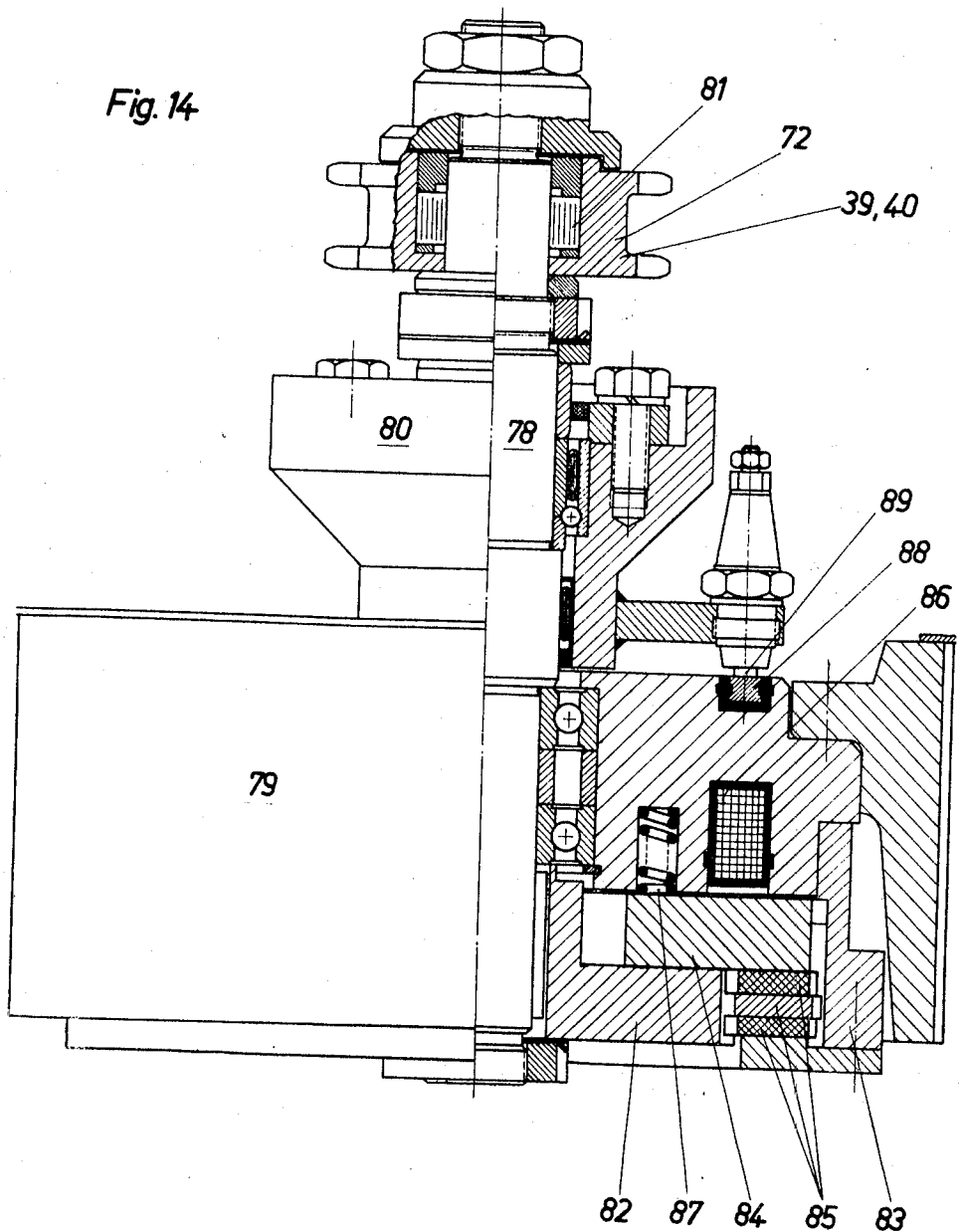

June 2, 1970     G. WEHR ET AL     3,515,185
APPARATUS FOR REMOVING BRANCHES AND BARK FROM TREES
Filed March 31, 1967     10 Sheets-Sheet 7

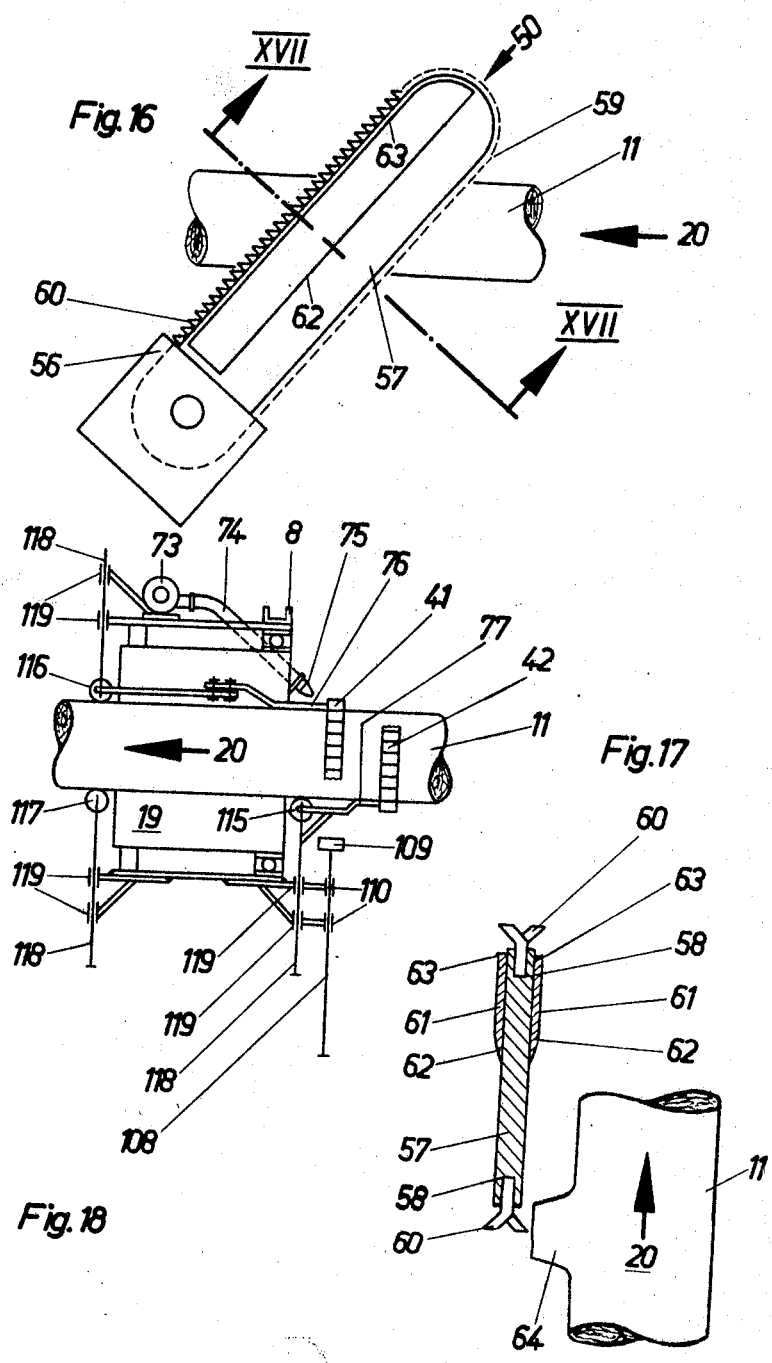

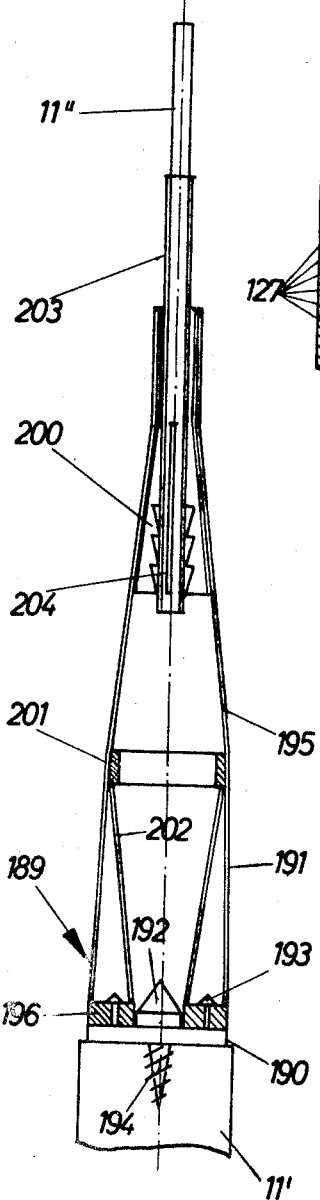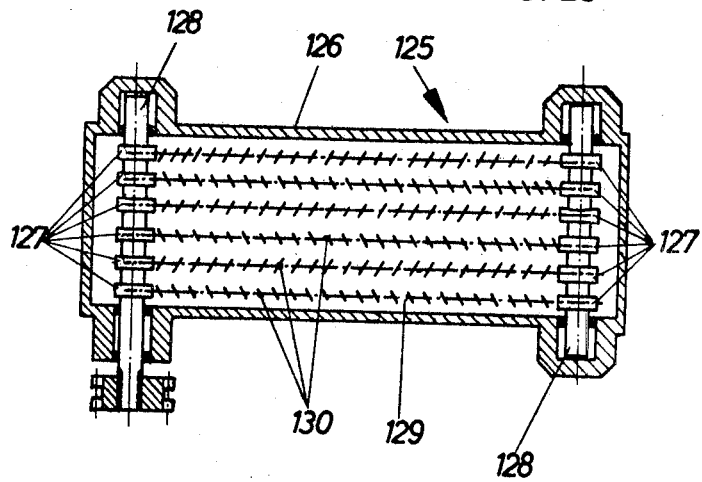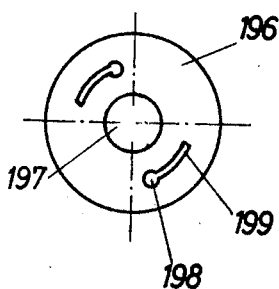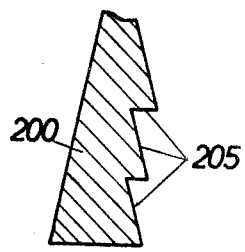

United States Patent Office 3,515,185
Patented June 2, 1970

3,515,185
APPARATUS FOR REMOVING BRANCHES AND BARK FROM TREES
Georg Wehr and Gotthold Gotze, Rotenburg an der Fulda, Germany, assignors to Rotenburger Metallwerke G.m.b.H., Rotenburg an der Fulda, Germany
Filed Mar. 31, 1967, Ser. No. 627,534
Claims priority, application Germany, Apr. 6, 1966, R 43,024
Int. Cl. B27l 1/00
U.S. Cl. 144—3         13 Claims

ABSTRACT OF THE DISCLOSURE

Apparatus for stripping branches and bark from tree trunks having a main frame over which the trunks are fed, two assembly frames slidably mounted on the main frame, and a pair of chain cutters movably mounted over guide pinions provided on the assembly frames, the chain cutters being adapted to run over and under said tree trunks. Means to independently adjust the tension of said chain cutters are also provided, along with a plurality of motor saws which have rotating saw chains in cross formation sloping toward the direction of feed of said tree trunks.

BACKGROUND OF THE INVENTION

Field of the invention

This invention relates to an apparatus for treating fallen trees and more particularly, to such an apparatus for transporting the trees from one location to another while removing branches and bark from trees during the transportation thereof.

Prior art

In order to facilitate transportation of trees that have just been cut, and in order to prevent attacks on the trees by insects, the tree trunks are usually stripped of bark and branches on site, and in some cases are cut to length ready for sale. Even today the stripping of bark and branches is mainly carried out by hand by using an axe or saw and a peeling knife.

Since this procedure calls for considerable time and a relatively large expenditure in terms of labor, efforts have been made for many years to mechanize it. Various arrangements have been developed to strip the bark from trunks which have already had their branches removed by hand, and there have also been many attempts at designing arrangements to strip the bark as well as branches.

A number of difficulties arise in the design of such equipment, such as those caused by the completely asymmetrical nature of the trees, reflected not only in the presence of the branches, but also in the lack of uniformity in the shape of trees which taper off from the base toward the top. These problems are compounded due to the fact that the branches bend to a greater or lesser degree in all possible directions.

To effect a perfect operation, the branches have to be removed and the bark must be stripped off completely by peeling it off until the white of the wood is exposed, without causing any damage to the wood. These circumstances alone indicate the reasons why developments in this particular field have not yet proven satisfactory.

SUMMARY OF THE INVENTION

An object of the present invention is to provide an arrangement which safely and reliably remove branches and bark down to the white of the wood from trees of the most widely differing shapes, without injuring the wood of the trunk.

The invention is distinguished by the fact that two chain cutters are used, one running along the upper side of the tree and the other on the underside, the drive pinions of said chains being linked with a drive unit through an overrunning freewheel and a starter and overload coupling, the traction and run-out ends of the chains being independently adjustable and bearing against supports when in the working position. Furthermore, preliminary trimming units are provided which consist of conventional motor saws with rotating chain saws crossed in relation to each other and sloping against the direction of feed of the tree trunk. Finally, the guide pinions just in front of the branches of the tree trunk to be processed are fitted with cutter heads.

As a further feature, each pinion has a scraper finger projecting into an annular groove in the pinion against the direction of pinion rotation and bearing a sloping wood chip-removal face at its free end.

It has also been found advantageous to fit a deflector plate on either side of the center piece of the motor saws, the said plate having a sloping leading edge eventually widening at the chain saw run-out edge by a distance corresponding to the distance that the chain saw teeth project sideways from the sides of the motor saw center piece.

A further distinguishing feature of the present invention includes the provision of at least two sliding supports moving in the direction of the sliding assembly frames within the main frame, each support having a pinion and being connected with the piston of a cylinder fixed to the relevant assembly frame, the cylinder/piston units for the assembly frames being connected to pressure sources of differing working pressures.

Further, it has been found advantageous to locate the sliding assembly frame of the arrangement within the main frame, with ball bearings and hard-chromed guide rods.

A further feature of the present invention lies in the provision of caterpillar chain conveyors held by caterpillar supports within the assembly frames and sliding in the same direction. These conveyors are adapted to press against the tree trunk, and several piston/cylinder units with a common pressure source are connected to a caterpillar support and to the main frame. The caterpillar chain conveyors have several common-drive caterpillar chains with crossed teeth, two caterpillar chains with opposing teeth pattern being able to run adjacent to each other at any time.

Still another feature of the invention includes the provision of supports for the two chain cutters, said supports being secured to additional frames which are adapted to slide on the main frame and which are connected by pull cables with the assembly frames in such a manner that as the latter move away from each other, the additional frames are also caused to part.

A particularly advantageous feature of the invention is facilitated by the provision of an additional framework having two lugs for the chain-cutter running over the top of the tree trunk, said additional framework adapted to move vertically on the main frame and being connected to one of the two assembly frames by means of a multi-unit block and tackle, so that as the assembly frames move away from each other, this additional framework rises.

Another advantage is made possible by the fitting of retainer pieces to the assembly frames at the lower periphery and below the axis of the three pinions nearest to the tree trunk, these pieces being adapted to mesh with the upper chain saw processing the top side of the tree trunk.

A further feature of the invention provides for a blower connected to a nozzle by means of a flexible hose, arranged to the rear of the upper chain saw and directing a blast of air onto it.

It has been found particularly satisfactory to load the tree trunks to be processed into the arrangement with the head first, additional advantages being derived by coupling the tree trunks together with a special coupling so as to achieve uninterrupted working.

BRIEF DESCRIPTION OF THE DRAWINGS

Reference is now made to the accompanying drawings for a better understanding of the nature and objects of the present invention, which drawings illustrate the best mode presently contemplated for carrying out the objects of the invention and its principles, and are not to be construed as restrictions or limitations on its scope.

FIG. 1 is a schematic side view of an arrangement of the present invention complete with accessories for guiding and conveying the tree trunk to be processed, the rough cutting components and chain opening arrangement being omitted in the interest of clarity;

FIG. 2 shows a top plan view of FIG. 1;

FIG. 6 is a schematic view of FIG. 4 showing the trimming units other components being omitted in the interest of clarity;

FIG. 7 is a schematic arrangement of a side view of FIG. 6;

FIG. 8 is a schematic view of FIG. 4 showing the guide pinions, other components being omitted in the interest of clarity;

FIG. 9 is a section along IX—IX of FIG. 8;

FIG. 10 is a scraper finger plan view;

FIG. 11 is a section of a guide pinion part in the vicinity of the tree trunk to be treated;

FIG. 12 is a plan view of the cutter head shown in FIG. 11;

FIG. 13 is a section along XIII—XIII of FIG. 12;

FIG. 14 is a partial section through a drive pinion;

FIG. 16 is a side view of a trimming saw;

FIG. 17 is a section along XVII—XVII of FIG. 16;

FIG. 18 is a section along XVIII—XVIII of FIG. 3;

FIG. 20 is a schematic plan view of a feed caterpillar unit;

FIG. 22 is a longitudinal section through a tree clamp;

FIG. 23 is a front view of the tree clamp; and

FIG. 24 is a partial axial section through the retainer component in the tree clamp.

DESCRIPTION OF THE PREFERRED EMBODIMENTS

Figure 3:
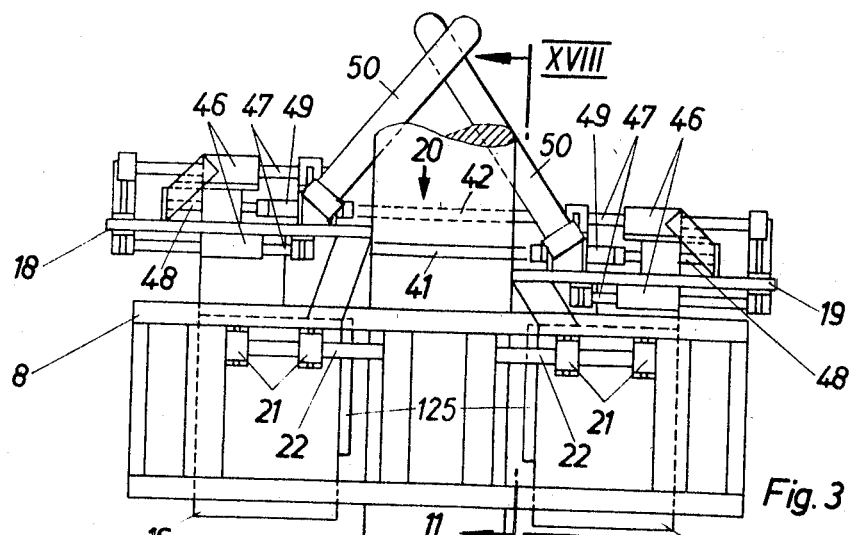
FIG. 3 is an enlarged top plan view of a portion of FIG. 2.

Referring to FIGS. 1 and 2 of the drawings, the reference numeral 1 refers in general to an apparatus for removing the bark and branches from the fallen trees, which apparatus is supported by legs 2 on the ground, and is located between a guide frame 3 on the loading side, and a discharge frame 6 on the discharge side. A plurality of cross cut saws 7 are provided on discharge frame 6 for cutting the tree trunks to a predetermined length.

Aprons 4 and 5 are connected to the guide frame 3 by means of tie rods allowing rapid removal, and similarly, the guide frame 3 and the discharge frame 6 are connected to the main frame 8 of the arrangement by means of tie rods 9. The guide frame 3 has two parallel slide tubes 10 for receiving the trunk to be processed, and the discharge frame 6 has slide tubes 12 running vertically to the previous slide tubes 10. A winch 13 with cable pulls 14 and/or 15 enables trunk 11 to be pulled through apparatus 1.

Figure 4:
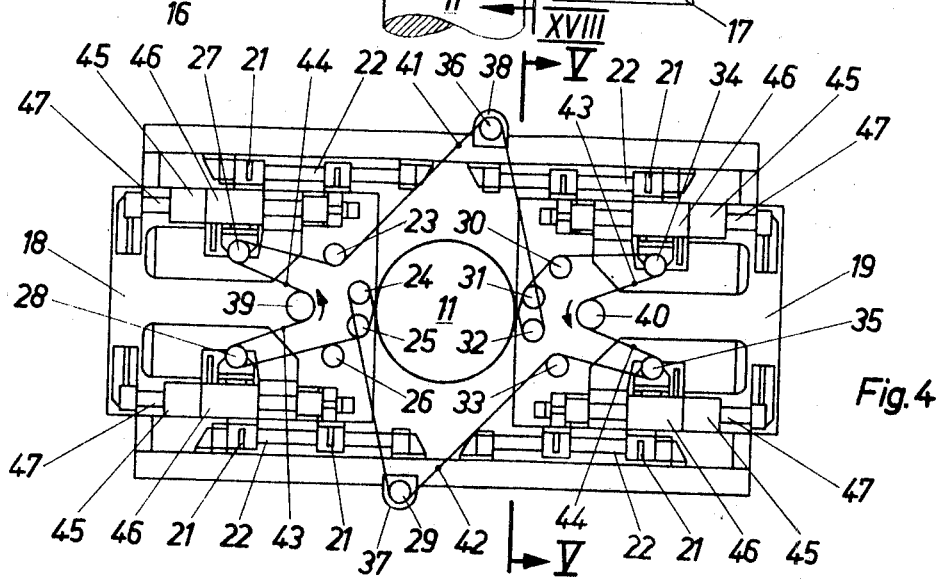
FIG. 4 is a section taken along IV—IV of FIG. 2.
Figure 5:
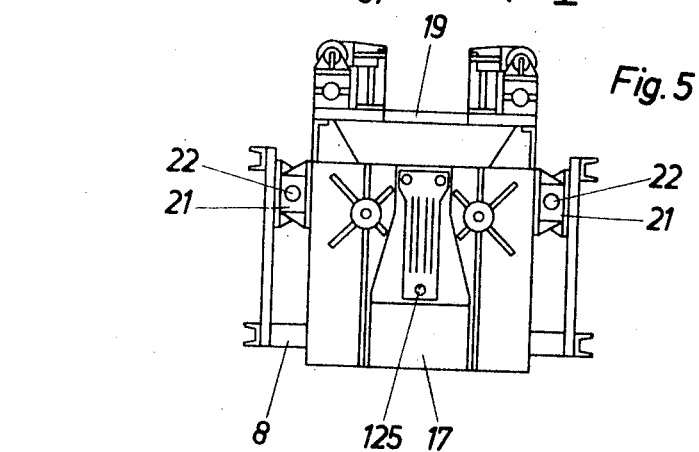
FIG. 5 is a section along V—V of FIG. 4.

As particularly shown in FIGS. 3 to 5, the apparatus 1 for stripping bark and branches from the trees in accordance with the invention consists largely of a main frame 8 containing two sliding parts 16 and 17. Together with their supports 18 and 19, these sliding parts 16 and 17 project from the main frame 8 against the direction of feed of the tree trunk 11, as shown by the arrow 20.

In order to ensure easy sliding of frames 16 and 17 within the main frame 8, they are mounted on ball bearings 21 running on hard-chromed guides 22 fitted to the main frame 8.

Rotating guide pinions 23 to 29 and 30 to 36 are mounted on bearings and are fitted to the sliding assembly frame supports 18 and 19. The pinions 29 and 36 are located on arms 37 and 38, respectively, which arms, in turn, are disposed upon assembly frame 16 or its matching support 18, and on the assembly frame 17 or its matching support 19, respectively. The supports 18 and 19 are also fitted with drive pinions 39 and 40.

Two chain cutters 41 and 42 run along the pinions on the supports 18 and 19. The chain arrangement is such that chain cutter 41 is driven by its drive pinion 39 over guide pinions 27, 23, 36 and 32, over the top of the tree trunk, and then over chain guide pinions 25, 26 and 28. As may be seen particularly from FIG. 3, the two chain cutters 41 and 42 run on differing planes, chain cutter 42 engaging the tree trunk before chain cutter 41 in the direction of the feed of the trunk.

It has been found that in order to ensure reliable operation of the arrangement, certain measures must be taken which allow independent setting of the traction side 43 and of the feed side 44 of each of the chain cutters 41 and 42. For this reason, the pinions 27, 28 and 34, 35 are located so that they can rotate on bearings provided on supports 45, these in turn sliding within their guides 46 under the action of guide rods 47 mounted on the supports 18 and 19 and operated by cylinder/piston assemblies 48 and 49. The latter assemblies are connected at one end to the supports 45, and at the other end to the supports 18 and 19, and the assemblies for pinions 27 and 34, or 28 and 35, are connected to a pressure source adjustable to differing working pressures as reqired.

As seen in FIG. 6, four conventional motor chain saws 50 are fitted to the supports 18 and 19 by means of brackets 51, to act as roughing units. Looking in the direction of feed of the tree trunk 11, the saws 50 are disposed before the chain cutters 41 and 42 in such a manner that they enclose a rhombic shaped group of surfaces simultaneously sloping towards the direction of feed of the tree trunk 11 as illustrated in FIG. 7.

The saws 50 remove the branches from the tree trunk 11 fed into the apparatus so that the branches cannot butt against the faces of the supports 18 and 19, which would otherwise hinder the advance of the tree trunk. In order to avoid the butting of any remaining branch stumps, cutter heads 52 are fitted to the guide pinions 23, 24, 25 and 31, 32, 33 as shown in FIGS. 11-13. These cutter heads have two cutter blades 53, each having one cutting edge 54, and heads 52 are secured to their respective pinions by means of screws 55. A protruding branch stump on the tree trunk 11 is cut away by the heads 52, thus preventing any hooking of the trunk until the feed locks it.

As will be seen from FIGS. 16 and 17, the saws 50 consist largely of a drive unit 56, a center piece with guiding groove 58, and a chain 59 complete with saw teeth 60 passing through the guiding groove. A guide plate 61 is located on either side of the center piece 57 of the saw units 50 as described, the guide plate having a sloping leading edge 62, whereas the edge 63 closest to the chain saw 59 run-out is as thick as the amount by which the teeth 60 on the chain 59 project from the saw center piece 57. The guide plate 61 prevents a branch stump 64 (see FIG. 17) from being dragged forward and lifting the chain 59 out of the guide groove 58 on the saw 50.

The scraper fingers shown in FIGS. 8 to 10 also ensure reliable running of the chain saws 41 and 42. In FIG. 8 it will be seen that each guide pinion and each drive pinion has a scraper finger 65, preventing the pinion from packing with the considerable quantity of wood chips and bark falling around, otherwise hindering the operation of the chain cutters 41 and 42. As shown in FIG. 10, each scraper finger consist largely of an extended portion 66, with a chip-removing face 67 at one end and a securing ring 68 at the other end. Each scraper 65 is secured by means of a threaded bush 70 and a screw 71 into the support 18 or 19, and projects into the groove 72 (see FIGS. 11 and 14) of the relevant pinion against its direction of rotation. As shown in FIG. 10, the leading edge 69 of each scraper finger 65 is nearest to the axis of each relevant pinion, while the chip-removing face 67 faces away from the pinion axis. The threaded bush may be welded on to the support components 18 and 19.

In order to ensure satisfactory running of the chain cutters 41 and 42 a blower 73 is fitted to the main frame 8, as shown in FIG. 18, and is connected to flexible hose 74 having nozzle 75 directed upon the chain cutter 41. The stream of air from the blower 75 ensures that the chain cutter 41 is always free of wood chips and bark residue.

An important feature for the satisfactory running of the chain cutters 41 and 42 lies in the buffers 76 and 77, indirectly secured to the main frame 8 and bearing against the tree trunk 11 to hold the relevant chain cutter support in the direction of feed of the tree trunk 11. The upper chain cutter support 76 bears against the upper side of the trunk, while the support 77 for the lower chain cutter 42 bears against the underside of the tree trunk.

The chain cutters 41 and 42 are operated by drive pinions 39 and 40, which, as will be seen from FIG. 14, are located on a shaft 78 driven by a drive wheel 79 through an electro-magnetic clutch. The shaft 78 is held in bearings so as to rotate from a support assembly 80 secured to part 16 or 17 of the arrangement. An overrunning free-wheel 81 of the usual known type is located between the drive pinions 39 and 40 and the shaft 78.

The electro-magnetic clutch consists of a flange 82 keyed onto the shaft 78, a rotating housing 83 mounted on the shaft 78, a pressure rings 84 and pressure discs 85 The ring and discs are mounted to allow their axial displacement between the flange 82 and the housing 83 in order to intermittently engage with the said flange and housing. An annular electro-magnet 86 is also provided along with several equidistant pressure springs 87, which transmit pressure from the pressure ring 84 to the pressure discs 85, thereby forming a pressure connection between coupling flange 82 and the housing 83. The electro-magnet is connected to an electrical lead by means of a slip ring 88 within the housing 83 and a matching slip ring contact 89, so that the magnet 86 can be energized and the electro-magnetic clutch can be released.

Figure 15:
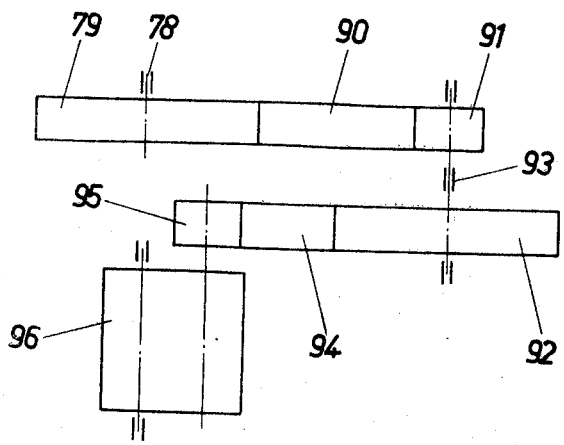
FIG. 15 is a side view of the pinion drive mechanism in accordance with FIG. 14.

Referring to FIG. 15, it is seen that the drive wheel 79 forms a fixed assembly with the coupling housing 83 connected by a toothed endless belt 90 to an intermediate gear 91, which together with a further intermediate gear 92, is keyed onto a shaft 93 mounted in bearings to rotate within assembly frame 16 or 17. The intermediate gear 92 is driven by an electro-motor 96 mounting a gear 95 and driving an endless toothed belt 94, the electro-motor housing within the assembly frame 16 or 17 pivoting eccentrically, so that the belt 94 is automatically tensioned by the motor torque.

The overrunning free-wheel 81 acts as an overload safety device in the event of sudden seizure of the chain cutters 41 and 42, while the electro-magnetic clutch 82–87 can only be switched on when the main motor 96 has reached its full operating speed. This is effected by means to ensure that the electro-magnet 86 is de-energized until this point is reached, so that the pressure ring 84 causes the friction rings to bear against each other under spring pressure 87, thus forming the connection means of wheel 79 and shaft 78 with the drive pinions 39 and 40.

Instead of the previously described axially moving coupling of the drive pinions 39 and 40 with the relevant motor 96, the coupling can be effected at a corresponding speed and power without interposing further components, simply by means of an electro-magnetic coupling operating in the reverse manner to that described above, being released when de-energized and engaged when energized thereby transmitting torque, and being siutably mounted on the shaft 78.

FIG. 11 shows one means of securing the guide pinions 23 to 36 onto the supports 18 and 19 or 45, and also illustrates the actual pinion design. As shown, pinion 32 is mounted on suitable bearings fitted to a shaft stub 97 so as to rotate easily without axial displacement, the stub being secured to the support 18 and 19 or 45 by means of a flange 98 which extends into a location peg assembly 99 sitting within a matching bore in the support 18 and 19 or 45.

As shown in FIG. 11, the drive and guiding pinions each have two rows of teeth 101 and 102, within which the twin-link chain cutters 41 or 42 engage their rollers 103. The chain plates 104 also have teeth which are not shown.

When no tree trunk is engaged in the apparatus 1, the upper chain 41 must be prevented from dropping and disengaging from pinions 23, 25 and 32; this also applying to the lower chain 42 in its engagement with pinion 29. For this purpose the retaining pieces 105 are fitted to cover pinions 23, 25, 32 and 29 at their lower half of their periphery, as seen in FIGS. 8 and 11. The retainer pieces 105 may for instance, be secured by means of brackets 106 to the supports 18, 19, or the arm 37 (see FIG. 11).

A pivoting cover or guard 107 can also be fitted to the arm 37 to protect the pinion from falling wood or bark chips, as shown in FIG. 8.

Figure 19:
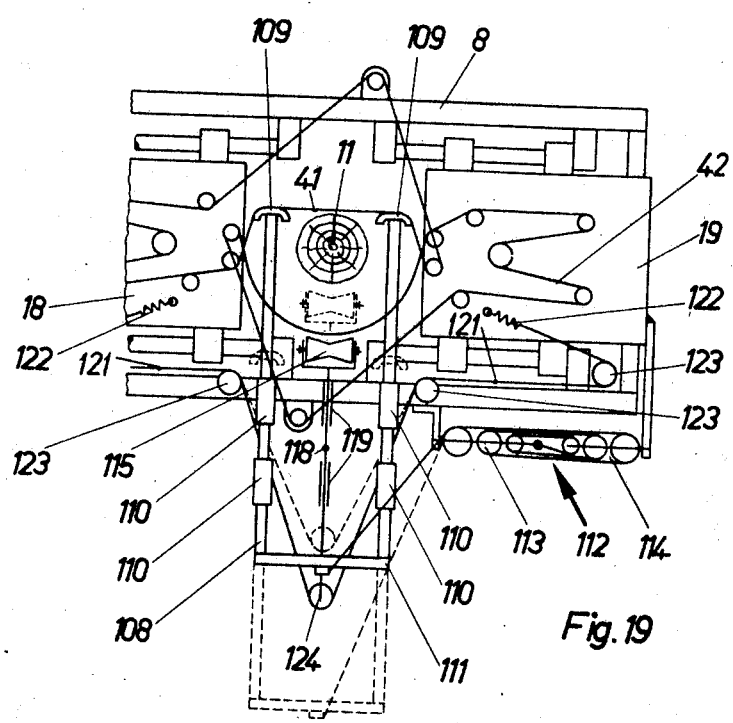
FIG. 19 is a view of FIG. 4 adding other elements.

The previously mentioned sagging or dropping of the upper chain cutter 41, when the apparatus is not occupied by a tree trunk, can also be prevented by a frame 108 with two lugs 109, said frame being mounted on the main frame 8 within suitable guides 110 as shown in FIGS. 18 and 19, so as to move vertically. The one end of a pulley block assembly 112 is secured to the lower cross bar 111 of the small frame 108, while the other end is connected to the framework 113 for the one set of pulley block wheels. The framework 113 is firmly affixed to the main frame 8, whereas the frame for the other set of wheels of the pulley block assembly 112 is fixed to the carrier component 19.

As shown in FIG. 18, the frame 108 is located in the same vertical plane as the upper chain 41. As the assembly frames 16 and 17, and the supports 18 and 19, move away from the tree trunk 11, the frames 113 and 114 also move away from each other, while frame 108 moves upwards to hold chain cutter 41 and prevent it from sagging. The lower chain 42 simply sags, thus presenting an aperture surrounded by chains 41 and 42, between the parted assembly frames 16 and 17 and the supports 18 and 19, as shown in FIG. 19, thus allowing an additional tree trunk to be introduced for processing. The position of frame 108 complete with lugs 109 when the tree trunk 11 is close to the supports 18 and 19 is shown in FIG. 19 by the dotted line.

It will be seen froms FIGS. 1, 2 and 18 that a lower guide roller 115 is located in front of the inlet of apparatus 1 to receive the tree trunk 11, an upper and lower roller 116 and 117 being placed at the outlet of the apparatus 1. Rollers 115 and 117 are preferably designed with a V-profile, and in order to prevent adhesion of resinous wood and bark the rollers are all made of plastic.

As the assembly frames 16 and 17 move away from a tree trunk 11, means are provided so that the rollers 115, 116 and 117 are simultaneously raised by the tree trunk. For this purpose, the rollers are mounted to rotate in stands 118 which, as shown in FIG. 18, can move vertically by means of guides 119 in the main frame 8. The stands 118 are pre-balanced away from the tree trunk 11, the frames for rollers 117 and 115 are held by their own weight, and the upper roller 116 is held by a suitably balanced counter-weight 120 (see FIG. 1) with an appropriate cable passing over a guide sleeve. A pull cable 121 as shown for roller 115 in FIG. 19 opposes this pre-loading, each end of the pull cable 121 being connected to springs 122 fitted to the supports 18 and 19, the cable 121 passing over four guide rollers 123 fitted to the main frame 8, as well as a return roller 124 affixed to the frame for roller 115. In FIG. 19 the operating position for roller 115 is shown in dotted lines, whereas rollers in the lifted position are shown in full line.

The position of supports 76 and 77 (see FIG. 18) in the vertical direction is similarly dependent upon the position of assembly frames 16 and 17, and supports 18 and 19 in relation to each other, just as for rollers 115, 116 and 117. Thus the supports 76 and 77 are more widely separated as the distance increases between assembly frames 16 and 17 and carrier components 18 and 19, and vice versa. This is due to the fact that supports 76 and 77 are secured to the stand 118 for rollers 115 and 116, as shown in FIG. 18.

The tree trunk feed is effected by two opposing and sliding caterpillar feed tracks 125, as represented in FIGS. 5 and 20, the said tracks being located within parts 16 and 17 and sliding in the same direction. Each caterpillar feed track 125 consists of a support 126 bearing two shafts 128 fitted with several toothed crowns 127, one of the shafts being driven by external means. Each pair of two opposing toothed crowns 127 meshes with a caterpillar chain 129. A support component not shown in FIG. 20 is located within the support 125 to carry the lower outer face of the chain 129. The upper side of chain 129 has crossed or alternating teeth 130, so that two caterpillar chains with opposing teeth 130 are located side by side.

The sliding caterpillar supports 126 moving within the assembly frames 16 and 17 are connected through two cylinder/piston assemblies to a baseplate on main frame 8, so that on actuation of the cylinder/piston assembly, the caterpillar chains can be pressed against a tree trunk to be processed.

Figure 21:
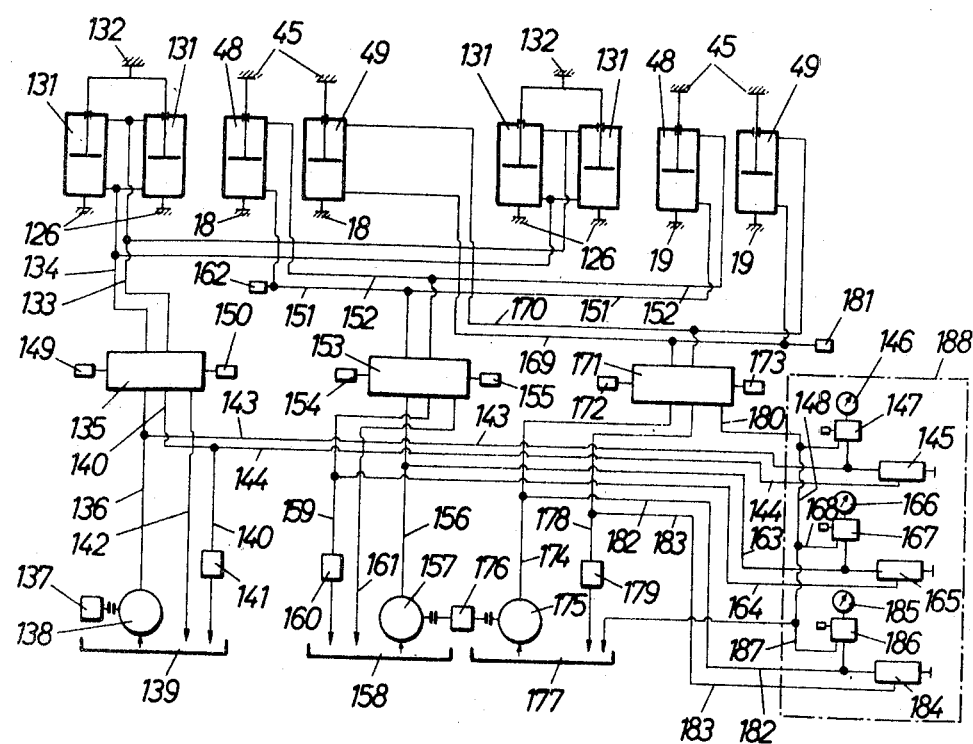
FIG. 21 is a circuit diagram for the hydraulic system of the arrangement of the present invention.
Figure 25:
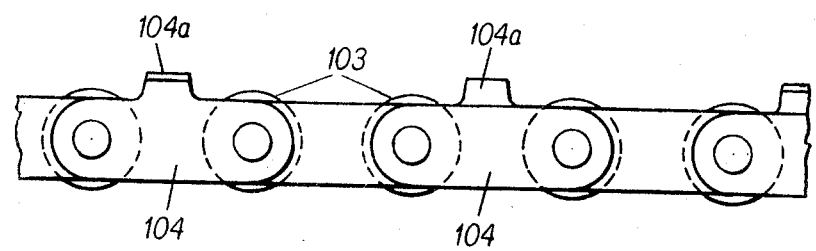
FIG. 25 is a fragmentary side elevation of an embodiment of the chain cutter.

FIG. 21 shows the hydraulic installation for actuating the feed caterpillars 125 and tensioning of the chain cutters 41 and 42. The cylinder/piston assemblies 131 for the feed caterpillars 125 are connected, on the one hand, to base plate 132 on the main rig frame 8, and on the other hand, to the supports 126 for the caterpillar chains 125. Each caterpillar chain 125 has two cylinder/piston assemblies 131 fulfilling two functions; each side of the cylinder/piston unit 131 is connected by lines 133 and 134 to an electro-magnetic valve 135, which in turn is connected to a motor driven pump 138 having its intake in a reservoir 139. The valve 135 is also connected directly with the reservoir 139, by way of a further line 140 and a filter 141. A third line 142 collects leakage oil from the valve 135 and takes it to the reservoir 139.

The pressure medium connection line 136 and the pressure discharge line 140 are also connected by branch lines 143 and 144 to a valve 145, adjusting the pressure in line 136. A pressure guage 146 is located before the valve 145, and a safety valve 147 is also provided in line 143. An oil discharge line leads from the safety valve 147.

While valve 145 allows the setting of the working pressure in line 136, the electro-magnetic valve 135 connects the pressure medium discharge line 140 to lines 133 or 134. Valve 135 has two electro-magnets 149 and 150. On energizing magnet 149, line 136 is connected with line 134, and line 140 with line 133, so that the cylinder/piston assemblies 131 move away from each other and the caterpillar chains linked to it are made to close over a tree trunk which is to be processed. When magnet 150 is energized, line 136 is connected to line 133, and line 140 is linked to line 134, the cylinder/piston assembly 131 being retracted, and the caterpillar chains are thus separated slightly in order to release an enclosed tree trunk.

It has already been explained that the traction and feed end of each cutter chain 41 and 42 can be adjusted independently. This is effected by use of double-acting cylinder/piston units 48 and 49 which bear at one end on the supports 18 and 19 and on the other end against supports 45. As seen in FIG. 21, the units 48 and 49 are fitted to supports 45 for the guide pinions 28, 34 on the tension side 43 of the chain cutters 41 and 42, and are connected to the electro-magnetic valve 153 by way of pressure medium lines 151 and 152. This valve has two electro-magnets 154, 155, and is, in turn, connected to a pressure medium feed line 156 coming from a pump 157 with its intake in reservoir 158. A pressure medium discharge line 159, complete with filter 160, leads from valve 153, together with a leakage oil line 161 straight into the reservoir 158. The line 151 is constantly under check from a pressostat 162.

The pressure medium feed line 156 and the discharge line 159 are connected by means of lines 163, 164 to a valve 165, through which the working pressure of the pressure feed line can be adjusted. A guage 166 together with safety valve 167 from which a leakage oil line and return line 168 branches off, are located before valve 165 in line 163.

Referring to FIG. 21, the cylinder/piston assemblies 48 and 49 are fitted to supports 45 for guide pinions 27, 35 on the feed side 44 of the chain cutters 41 and 42, and are connected to an electro-magnetic valve 171 through pressure medium lines 169 and 170. The valve has two electro-magnets 172 and 173, being connected to a pressure feed line 174 from an electro-pump 175 and 176, this same motor driving the previously mentioned pump 157. The pump intake is located in a reservoir 177 and a return line 178, complete with filter 179, goes from the valve 171 to the reservoir 177, as well as the leakage oil line 180 for valve 171. A pressostat 181 is also connected to the pressure feed line 169.

Lines 182 and 183 lead to a valve 184 from the pressure feed 174 and discharge lines 179, this valve allowing the adjustment of the feed line 174 pressure. A pressure gauge 185 and safety valve are connected to line 182 before valve 184. A leakage oil and return line 187 go out from the safety valve to connect with leakage oil and return lines 148 and 168 in line 180.

The tension of the chain pull 43 and chain feed 44 on chain cutters 41 and 42 can thus be adjusted by way of valves 165 and 184, respectively. In contrast, valves 153 and 171 do not serve for adjusting specific working pressures in the cylinder/piston assemblies 48 and 49, but are utilized for the purposes of optional connection of pressure feed lines 156 or 174 with lines 151, 152 or 170, and pressure discharge lines 159 or 178 with lines 152 or 151, 170 or 169. On energizing magnet 154 the pressure feed line 156 is accordingly connected with line 152, while energizing of magnet 155 connects the pressure feed line 156 with line 152 and pressure discharge line 159 with line 151. Similarly, when electro-magnet 172 is energized, the pressure feed line 174 is connected with line 169, and the pressure discharge line 178 wih line 170, whereas on energizing the electro-magnet 173, the pressure feed line 174 is connected with line 170, and pressure discharge line 178 with line 169. On energizing magnets 154 and 172, pinions 27, 28 and 34, 35 are parted, whereas on energizing electro-magnets 155 and 173, the pinion pairs 27, 28 and 34, 35 move towards each other (FIG. 4).

The components surrounded by a frame 188, as shown in FIG. 21, are preferably grouped in a central switch box together with the remainder of the electrical and mechanical switch gear for the FIG. 1, as well as any auxiliary equipment such as the winch 13 (FIG. 2). In addition, the hydraulic installation as represented in FIG. 21, together with pressure reservoirs 139, 158 and 177, as well as motors 137 and 176 and the relevant pumps 138, 157 and 175, are preferably built into the assembly frames 16 and 17.

It has been found particularly advantageous to feed the tree trunk 11 into the rig starting from the upper or smaller end. In this way, as the tree trunk passes through the rig, the pressure in the cylinder/piston assemblies 131 and 48, 49 rises automatically in accordance with the increase in diameter, thereby automatically increasing the tension on the chain cutters. This increase is necessary to maintain a uniform chain cutter pressure against the tree in process. If the tree were fed through bottom end first, care would have to be taken to ensure that the pressure in the cylinder/piston assemblies 48, 49 is reduced in accordance with the fall-off in trunk diameter as it passes through, i.e., the tension on the chain cutters 41, 42 having to be reduced to ensure that chain pressure against the tree surfaces remains uniform. However, on feeding the trees in top-end first, these measures are not necessary.

The rig can be used to particularly great advantage when the trees to be processed can be fed in continuously. This is facilitated by the trunk coupling arrangement shown in FIGS. 22 to 24. The coupling 189 consists of a connector 191 and driver or dragging component 190. The dragging component 190 consists mainly of a circular disc with a locating point 192 and two connecting bolts 193 on the disc face. The other side of the disc is fitted with a pin 194 with a rough surface consisting of reverse hooking recesses.

The connector consists of a tapered shell 195, closed at the wider end by a connecting flange 196. As shown in FIG. 23, the flange has a circular aperture 197 through which the locating point 192 will pass, as well as two bores 198 on the same diameter to fit the largest diameter of bolts 193, the bores extending into arc-like slits 199, the width of which is suited to the diameter of the bolt shank 193.

A sliding wedge piece 200 is located inside the narrower end of the connector 191, the movement of the wedge being restricted by a stop ring 201 in the direction of the connecting flange 196, the stop ring being fixed inside the connector 191, and bearing through a tapered shell 202 against the connector flange 196. The outer part of the wedge piece 200 matches the inside of the connector 191 at the front and finishes in a cylindrical part. The wedge 200 is drilled at the center 203, the forward tapered part having four longitudinal slots 204, allowing four diametrically opposing lugs as related to the tree coupling assembly 191. As may be seen from FIG. 24, these lugs are toothed as shown at 205 on the curve face turning towards the tree.

The coupling of two tree trunks by means of the coupling arrangement is effected by initially hammering the drag component 190 into the bottom end face of the first tree 11', a following tree 11" carrying the connector 201 at the top, then being presented to the bottom of the first tree 11'. The connecting piece 191 with connector flange 196 is then pushed over the locating point 192 and drag bolts 193, and then turned so that the bolts 193 are held by their shanks in the slots 199 in the connecting flange 196. The first tree 11' then pulls the next tree along by means of the coupling, the latter being held firmly in the connector 191 by the wedge 200 with its teeth 205.

In addition to the feed, discharge, and side aprons as shown in FIGS. 1 and 2, a conveyor band can also be installed for the removal of branches, then bark and wood chips. Instead of the legs 2, the rig can usefully be fitted with a mobile chassis, allowing it to be used as a trailer in order to move the rig easily from site to site. In addition to the rig, the trailer chassis can also be fitted with a diesel engine and generator to drive the rig as well as all additional accessories, a cab or switch gear housing receiving all the necessary controls for the rig and accessories. The cab can be mounted on a pivot to allow complete supervision of the site, the pivot being mounted on a rotating arm allowing the cab to be maneuvered into working position when required, then folding back onto the trailer for towing.

The arrangement in accordance with the invention operates in the following manner. As may be seen from FIG. 2, the felled tree trunks 11 are presented either from the front onto the forward apron 5, or from the side onto the lateral apron 4. The lateral apron 4 and the guide frame 3 can be much longer than shown in FIG. 2, so that several tree trunks 11 can be aligned in the guide channel 3 at once, the trees being linked by means of the previously described coupling arrangement. The tree trunks 11 can be winched off the ground with the aid of the winch cables 14 or 15 and the winch 13. The tree trunk 11 to be processed is conveyed by the sliding tubes 10 of the guide frame 3, the guide rollers 115, 116, 117, and the sliding tubes 12 of the discharge frame 6 once the stripping has been completed. The feed is effected by means of the caterpillar feed chains 125. As soon as the branches of trees to be processed 11 come within the range of the trimming saws 50, the branches are cut off, preventing them from butting against the front of the apparatus 1, i.e., against the supports 18 and 19. Branch stumps and bark are then removed from the tree trunk by means of the main chain cutters 41 and 42 until the tree trunk is peeled white, at which time it is discharged by the discharge frame 6, is cut to the required lengths by means of cross cut saws 7 located so that they will slide along the discharge frame 6. Alternately, the white peeled uncut trunks can be rolled off the discharge frame 6.

The arrangement in accordance with the invention considerably reduces injury to the wood beneath the bark, allowing peeling of the processed trunks, in such a manner that they can be used for paper making without further treatment, or they can be finished by dressing.

Of course, variations of the specific construction and arrangement of this type of mechanism herein disclosed can be made by those skilled in the art without departing from the invention as defined in the appended claims.

We claim:

1. Apparatus for stripping branches and bark from tree trunks, said apparatus comprising a main frame, two assembly frames mounted on said main frame for slidable movement with respect thereto, means to feed a tree trunk along said main frame in a direction at right angles to the direction of movement of said assembly frames, said means including a caterpillar feed chain disposed on said assembly frames, a plurality of guide pinions mounted on said assembly frames, a pair of chain cutters movably mounted over said guide pinions and adapted to run over and under said tree trunks, means co-acting with said guide pinions to independently adjust the tension of said chain cutters, drive means to drive said chain cutters, and a plurality of motor saws mounted upstream of said chain cutters on said main frame and having rotating saw chains in cross formation sloping towards the direction of feed of said tree trunks.

2. The apparatus of claim 1, wherein said drive means comprise a drive unit for said pinions, and an overrunning freewheel and a drive end overload coupling operatively connecting said drive pinions and said drive units.

3. The apparatus of claim 1, further comprising a plurality of cutter heads fastened to said guide pinions and extending in the path of branches extending from said tree trunks.

4. The apparatus of claim 1, further comprising means to support said chain saws.

5. The apparatus of claim 1, further comprising a scraper finger cooperating with each of said pinions, said scraper finger projecting into an annular groove in its corresponding pinion against the direction of rotation of said pinion, and having a sloping chip-deflecting face.

6. The apparatus of claim 1, wherein said motor saws have a deflector plate located on either side thereof, said plates each having a sloping approach surface, the thickness of the plate adjacent to the motor saw chain run-out being equal to the projection of the motor saw chain teeth beyond the sides of the saw.

7. The apparatus of claim 1, wherein said means to adjust the tension of said chain cutter comprises a sliding support slidably mounted on said frame member, each support carrying one of said pinions and cylinder piston means connected to said sliding supports for moving same.

8. The apparatus of claim 1, wherein said assembly frames are mounted so as to slide within the main frame by means of ball bearings and hard-chromed guide rods.

9. The apparatus of claim 1, wherein said caterpillar chains comprises several chains with crossed teeth, said caterpillar chains being located within the frame assemblies and adapted to slide in the same direction, and further comprising a common drive for said chains.

10. The arrangement of claim 6, characterized in that two caterpillar chains with opposing crossed teeth are always located adjacent to each other.

11. The apparatus of claim 4, further comprisng a plurality of additonal frames slidably mounted with respect to said main frame and adapted to carry said support means and cable means interconnecting said additional frames to said assembly frames in such a manner that a parting movement of the assembly frames causes a parting movement of said additional frames.

12. The apparatus of claim 1, further comprising an additional frame having two lugs for engaging the chain passing over the top of the tree trunk to prevent sagging of said chain, said additional frame assembly being adapted to slide along the main frame, and means connecting said additional frame with one of said assembly frames in a manner so that when said assembly frames move away from each other, said additional frame is moved into engagement with said said chain.

13. The apparatus of claim 1, further comprising retaining pieces located opposite the lower part of the pinion peripheries.

References Cited

UNITED STATES PATENTS 3,030,986   4/1962   Longert _____ 144—2

FRANCIS S. HUSAR, Primary Examiner

U.S. Cl. X.R.
144—208; 287—115